United States Patent [19]

Dallmer

[11] 4,206,811
[45] Jun. 10, 1980

[54] HOOF COVERING

[76] Inventor: Helmuth Dallmer, No. 25, Wiebelsheidestrasse, 5760 Arnsberg 1, Fed. Rep. of Germany

[21] Appl. No.: 828,066

[22] Filed: Aug. 26, 1977

[30] Foreign Application Priority Data

Aug. 28, 1976 [DE] Fed. Rep. of Germany ....... 2638970
Apr. 16, 1977 [DE] Fed. Rep. of Germany ....... 2716968

[51] Int. Cl.² ............................ A01L 3/00; A01L 5/00
[52] U.S. Cl. ......................................... 168/4; 168/17; 168/DIG. 1
[58] Field of Search .................... 168/4, 12, 17, 21, 22, 168/DIG. 1, 20, 24

[56] References Cited

U.S. PATENT DOCUMENTS

| 592,261 | 10/1897 | Stephens | 168/DIG. 1 |
| 1,116,326 | 11/1914 | Powlowski et al. | 168/20 |
| 1,936,306 | 11/1933 | Leiter | 168/22 |
| 3,494,422 | 2/1970 | Clark | 168/DIG. 1 |
| 3,519,079 | 7/1970 | Bieber | 168/DIG. 1 |
| 3,913,679 | 10/1975 | Bucalo | 168/24 X |
| 4,036,302 | 7/1977 | Spencer | 168/4 |

FOREIGN PATENT DOCUMENTS

21171 of 1929 Australia .................................. 168/12

*Primary Examiner*—Louis G. Mancene
*Assistant Examiner*—Robert P. Swiatek
*Attorney, Agent, or Firm*—John C. Smith, Jr.

[57] ABSTRACT

A hoof covering for horses comprises a horseshoe-shaped plastic body which has a generally acute-angled cross section so as to form a lower side with a flat upper surface and an upwardly extending side in the form of a conical side wall. The flat upper surface serves as a support for a hoof of a horse. The conical side wall is capable of being bent into the desired shape for mounting the hoof covering on the hoof by an adhesive.

10 Claims, 5 Drawing Figures

U.S. Patent  Jun. 10, 1980  4,206,811
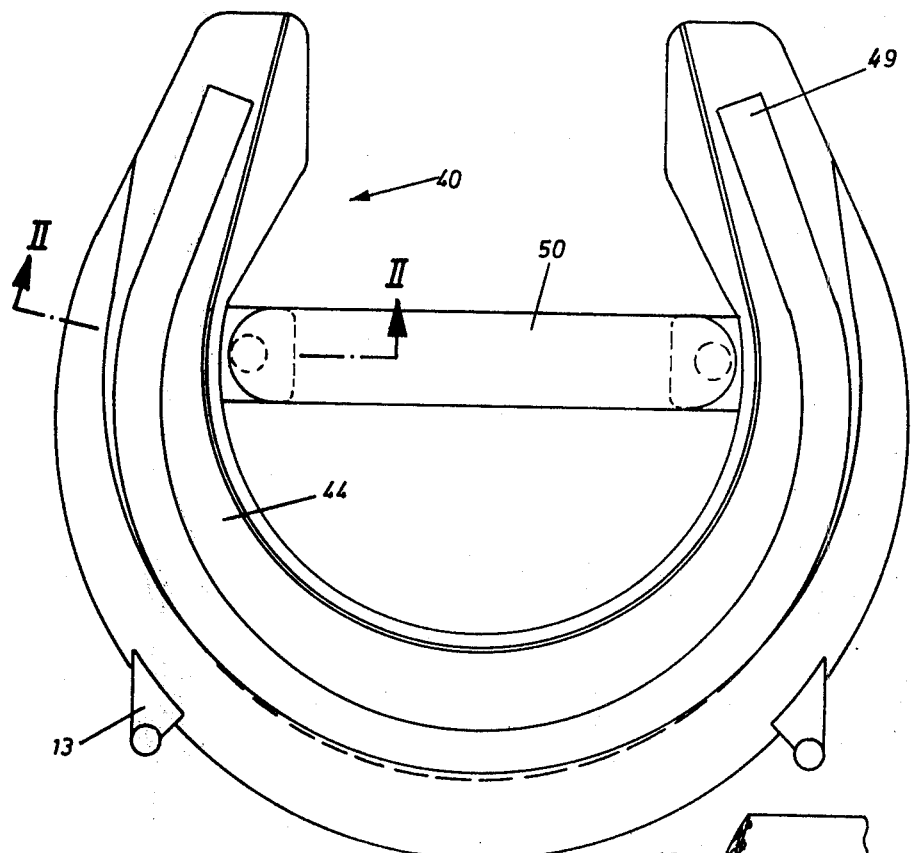

HOOF COVERING

SUMMARY OF THE INVENTION

It is an object of the invention to provide a hoof covering for horses whose application does not require horseshoe nails or the experience of a farrier.

Another object of the invention is to provide a hoof covering which can be easily adapted to the form and size of a hoof of a horse.

To attain these objects the present invention provides a hoof covering for horses which comprises a horseshoe-shaped plastic body having a generally acute-angled cross section, said plastic body having a lower side with a flat upper surface which serves as a support for a hoof of a horse, and an upwardly extending side in the form of a conical side wall capable of being bent into the desired shape for mounting the hoof covering on the hoof by adhesive means.

In accordance with this invention the use of horseshoe nails is no longer necessary, because the horseshoe-shaped plastic body is secured via the inner surface of its conical side wall to the lateral surface of the hoof by adhesive means. Injuries to the horse by nailing are thus avoided. By the use of a clamping strap put and drawn firmly round the plastic body, the whole of the conical side wall is pressed against the lateral surface of the hoof until the adhesive means have set. The clamping strap is removed after the setting. Due to the deformability of the plastic material, the plastic body can be adapted to the shape of the hoof. The hoof is thereby not put under pressure. Between the bottom surface of the hoof and the flat upper surface of the lower side of the plastic body an adhesive bond can also be produced. Growing of the hoof is not impaired. In a simple embodiment of the hoof covering according to the invention a plurality of spaced-apart studs may be formed integral with the lower surface of the lower side of the plastic body. When the studs are worn out, the hoof covering can be removed from the hoof by means of a spatula.

By providing a plurality of small cylindrical projections on the inner surface of the upwardly extending side of the plastic body the adherance of this side to the hoof can be increased because the projections penetrate the adhesive means and create a cogging.

For securing the clamping strap in its position, at least two nose-like projections are preferably formed on the outer surface of the upwardly extending side of the plastic body, said projections being adapted to engage in corresponding holes in the clamping strap when it is laid round the plastic body.

An advantageous embodiment is one in which a horseshoe-shaped spring steel band is embedded in the plastic body so as to extend parallel to the ground. This steel band creates a resilient resetting force when the free ends of the horseshoe-shaped plastic body are drawn further apart for the purpose of mounting the plastic body on a larger hoof.

The plastic body is preferably a unitary molding of wear-resistant plastic material and has an adhesive accepting tissue sprayed onto the surfaces that are to be adhered to the hoof. In this manner a plastic body can be produced from a wear-resistant plastic material which in itself is not suitable for adhering purposes.

In another embodiment of the invention a horseshoe-shaped spring steel band is pressed into a dovetailed groove in the plastic body, said dovetailed groove opening into the flat upper surface of the lower side of the plastic body. The width of the dovetailed groove diminishes towards the flat upper surface of the lower side of the plastic body. The steel band can be suitably shaped by deformation to adapt it to the hoof before mounting. After mounting, the pliable plastic body is of the same shape as the steel band.

The distance between the two free ends of the plastic body can be adjusted and fixed in position with the aid of a plastic strap which extends diagonally to the axis of symmetry, a stud formed integral with each end section of the plastic strap engaging in an opening in a tongue formed integral with the internal surface of the lower side of the plastic body.

BRIEF DESCRIPTION OF THE DRAWING

An embodiment of the invention will now be described by way of example and with reference to the accompanying drawing, in which:

FIG. 1 is a top plan view of a hoof covering according to the invention;

FIG. 2 is a cross section along the line II—II of FIG. 1, the spring steel band being omitted;

FIG. 3 is a similar cross section with the spring steel band inserted in its groove;

FIG. 4 is a side elevational view of a plastic strap, and

FIG. 5 is a bottom view thereof.

DESCRIPTION OF THE PREFERRED EMBODIMENT

FIG. 1 shows a horseshoe-shaped hoof covering for horses which consists substantially of a wear-resistant injection molded plastic body 40 of acute-angled cross section. The lower side of the acute angle i.e. of the plastic body 40, has, as shown in FIGS. 2 and 3, a trapezoidal cross section and a flat upper surface 44 which serves as a support for a hoof of a horse. The other side of the acute angle extends upwardly and is in the form of a conical side wall 41 capable of being bent into shape for being mounted on the hoof by adhesive means. Onto the inner side of the conical side wall 41 a tissue 42 has been sprayed which is suitable to accept adhesives. In addition, on the inner side of the conical side wall 41 a plurality of small projections 43 are formed.

The plastic body 40 is fitted to the hoof in such a manner that the undersurface of the hoof rests on the flat upper surface 44 of the plastic body 40, and the lateral surface of the hoof engages the inner side of the conical side wall 41. The mounting of the plastic body 40 is effected by adhering its conical side wall 41 and possibly its flat upper surface 44 to the hoof.

The small projections 43 formed integral with the inner surface of the upwardly extending side of the plastic body penetrate the layer of adhesive and create a cogging which improves the adherance.

As shown in FIG. 1, two nose-like projections 13 are formed on the outer surface of the conical side wall 41. These projections 13 engage in holes in a clamping strap (not shown) which is applied to the conical side wall during the setting of the adhesive. The co-operation of the projections 13 with the holes in the clamping strap gives the clamping strap more grip.

A rim 27 is formed on the flat upper surface 44 of the lower side of the plastic body and prevents liquid adhesive applied to the said flat upper surface from flowing away laterally.

A number of spaced-apart studs 47 and cavities 46 are formed on and in the undersurface of the plastic body, respectively.

FIG. 2 shows a dovetailed groove 45 in the plastic body in which a horseshoe-shaped spring steel band 49 can be forced.

The dovetailed groove 45 opens into the flat upper surface 44 of the lower side of the plastic body and its width diminishes towards said flat upper surface 44. The horseshoe-shaped spring steel band is rectangular in cross section and is produced individually. Before the plastic body is adhered to the hoof, the steel band is adapted to the shape of the hoof. The steel band 49 is then forced into the groove and is reliably held therein as shown in FIG. 3. The horseshoe shape of the plastic body adapts itself to the horseshoe shape of the steel band.

FIGS. 4 and 5 show a unitary molded plastic strap 50 having at one end several studs 51 and on the other end one stud 51. This strap 50 serves to adjust the distance between the two free ends of the elastic body according to the size of the hoof. Before the plastic body is adhered to the hoof, the unnecessary studs on the one end and any eventual overlapping parts of the strap 50 are cut off. Only the studs remain which correspond to the necessary distance between the two free ends of the plastic body. Then each stud is inserted from above into a hole in a tongue 48 formed on the inner surface of the plastic body. After mounting, the upper surface of the strap 50 lies on the same level as the flat upper surface 44 of the plastic body.

In the conical side wall 41 of the plastic body holes 53 are formed. These holes serve as a passage for nails or screws which may be used as an additional means for fixing the plastic body to the hoof. These holes can also be used to inject the adhesive means mechanically.

The hoof covering according to the invention can also be equipped with downwardly projecting spikes 52. These spikes may be fixed to the steel band 49 and can be driven through suitable holes in the groove until they project from the bottom of the plastic body when the steel band is forced into its groove 45.

The invention may be embodied in other specific forms without departing from the spirit or essential characteristics thereof. The embodiment is therefore to be considered in all respects as illustrative and not restrictive.

What is claimed is:

1. A hoof covering adapted to be adhesively bonded directly to the hoof of a horse comprising a horseshoe-shaped plastic body made integrally of deformable wear-resistant plastic material and having a generally acute-angled cross section, said plastic body having a lower side with a flat upper surface which serves as a support for a hoof of a horse, an upwardly extending side wall capable of being bent to conform to the shape of the side surface of said hoof, a tissue bonded to at least a portion of the interior of said side wall, said tissue comprising an adhesive accepting material, adhesive means for bonding said tissue directly to said hoof, a plurality of projections formed on the interior surface of said side wall and penetrating said adhesive means to enhance said bonding to said hoof, said lower side of said plastic body defining a horseshoe-shaped dovetailed groove opening into a surface thereof and a horseshoe-shaped spring steel band preformed to the particular shape of said hoof to be covered and laterally press-fitted into and retained in said dovetailed groove to conform said plastic body to the preformed shape of said steel band.

2. A hoof covering for horses as claimed in claim 1, wherein a number of spaced-apart studs are integrally formed with the lower surface of the lower side of the plastic body.

3. A hoof covering for horses according to claim 1, wherein at least two nose-like projections are formed on the outer surface of the upwardly extending side of the plastic body.

4. A hoof covering for horses according to claim 1, wherein the width of said horseshoe-shaped dovetailed groove diminishes towards and opens into said flat upper surface of the lower side of the plastic body.

5. A hoof covering for horses according to claim 4 further comprising a plurality of spikes integral with said steel band and extending downwardly therefrom through holes in said plastic body and projecting from the lower surface of the lower side of said plastic body.

6. A hoof covering for horses according to claim 1, wherein the free end sections of the horseshoe-shaped plastic body are held together by a plastic strap which extends diagonally to the axis of symmetry, a stud formed integral with each end section of the plastic strap engaging in an opening in a tongue formed integral with the internal surface of the lower side of the plastic body.

7. A hoof covering for horses according to claim 1, wherein a plurality of holes are provided in said side wall for injecting said adhesive means between the interior surface of said side wall and the hoof while said hoof covering is positioned on the hoof.

8. A hoof covering for horses according to claim 1 further comprising a tissue secured to at least a portion of the flat upper surface of said lower side, said tissue comprising an adhesive accepting material and adhesive means for bonding said tissue directly to said hoof.

9. A hoof covering for horses according to claim 1 further comprising a rim projecting upwardly from said flat upper surface, said rim being spaced from said side wall to prevent said adhesive means from flowing laterally beyond a predetermined distance from said side wall.

10. A hoof covering for horses according to claim 1 wherein said side wall has a conical shape.

* * * * *